United States Patent [19]

Tausheck

[11] Patent Number: 6,092,127
[45] Date of Patent: Jul. 18, 2000

[54] DYNAMIC ALLOCATION AND REALLOCATION OF BUFFERS IN LINKS OF CHAINED DMA OPERATIONS BY RECEIVING NOTIFICATION OF BUFFER FULL AND MAINTAINING A QUEUE OF BUFFERS AVAILABLE

[75] Inventor: Eric Gregory Tausheck, Citrus Heights, Calif.

[73] Assignee: Hewlett-Packard Company, Palo Alto, Calif.

[21] Appl. No.: 09/080,058

[22] Filed: May 15, 1998

[51] Int. Cl.[7] .............................. G06F 13/10; G06F 12/02
[52] U.S. Cl. ................. 710/56; 710/22; 710/26; 710/57
[58] Field of Search .................... 710/56, 22, 26, 710/57

[56] References Cited

U.S. PATENT DOCUMENTS

| | | | |
|---|---|---|---|
| 5,155,830 | 10/1992 | Kurashige | 710/24 |
| 5,426,639 | 6/1995 | Follett et al. | 370/412 |
| 5,430,846 | 7/1995 | Moore | 710/56 |
| 5,687,392 | 11/1997 | Radko | 710/22 |
| 5,765,023 | 6/1998 | Leger et al. | 710/22 |
| 5,928,339 | 7/1999 | Nishikawa | 710/26 |

OTHER PUBLICATIONS

*SYM53C875 PCI–SCSI I/O Processor with Fast–20 Data Manual*, available from Symbios Logic Inc., 4420 Arrowswest Drive, Colorado Springs, CO 80907–3439, pp., i, 5–4,6–5 through 6–7,6–20 through 6–24.

*Primary Examiner*—Thomas C. Lee
*Assistant Examiner*—Ilwoo Park

[57] ABSTRACT

A system which performs chained direct memory access (DMA) operations, includes a working set of buffers, a first-in-first-out memory, a first DMA co-processor, a second DMA co-processor and a controlling processor. The working set of buffers are available for receiving data from chained DMA operations. The first-in-first-out memory store addresses of buffers, from the working set of buffers, which are available for immediate allocation. The first DMA co-processor and the second DMA co-processor perform the chained DMA operations. The controlling processor sets up the chained DMA operations and adds addresses of free buffers to the first-in-first-out memory. When performing a first chained DMA operation, the first DMA co-processor accesses the first-in-first-out memory to allocate for itself a first buffer from the queue of buffers when a first link in the first chained DMA operation requires a buffer. When the first buffer is filled, the first DMA co-processor immediately notifies the controlling processor. When performing a second chained DMA operation, the second DMA co-processor accesses the first-in-first-out memory to allocate for itself a second buffer from the queue of buffers when a first link in the second chained DMA operation requires a buffer. When the second buffer is filled, the second DMA co-processor immediately notifies the controlling processor.

19 Claims, 5 Drawing Sheets

DYNAMIC ALLOCATION AND REALLOCATION OF BUFFERS IN LINKS OF CHAINED DMA OPERATIONS BY RECEIVING NOTIFICATION OF BUFFER FULL AND MAINTAINING A QUEUE OF BUFFERS AVAILABLE

BACKGROUND

The present invention concerns transmission of data within a computing system and pertains particularly to dynamic allocation and re-allocation of buffers in links of chained direct memory access operations.

A design demanding multiple concurrent chained direct memory access (DMA) operations can be limited in the number of concurrent chained-DMA operations which can be performed due to associated memory limits. For example, when each DMA operation is associated with a memory buffer, the memory buffers are typically allocated before the multiple concurrent chained-DMA operation is started so that each buffer can be linked to the chain. Once the chained-DMA operation has completed, all the buffers in the chain can be moved to the next stage in processing and eventually become free for re-use. During the time that the chained-DMA operation is in effect these buffers can not be used for other purposes. Thus, the number of concurrent chained-DMA operations is limited in a direct relationship to how much memory is available (and limited by that memory already utilized for purposes including other active chained-DMA operations). This problem is most prominent when there is a dynamic demand of the system to concurrently provide combinations of many (unrelated) data transfers, and each data transfers is relatively large. Concurrence is limited because of a lack of memory and/or the number of concurrent requests supported (and possibly other resource constraints).

One approach to the problem of concurrent demand of memory is to require more memory in the system. This is an expensive solution for many applications.

Another approach is to divide each multiple concurrent chained-DMA operation into smaller (in memory requirements) multiple concurrent chained-DMA operations and perform the overall data transfer in more, "smaller", re-usable multiple concurrent chained-DMA operation. One problem with this approach is that performance is typically poorer with more multiple concurrent chained-DMA operations because of the increased DMA control management associated with building, launching, and servicing completion of each chained-DMA operation. Additionally, performance may be lost during the gaps of time between one chained DMA operation being finished and another starting, unless complexity and components are added to the application to keep the data moving between chained DMA operations.

One application in which multiple concurrent chained DMA operations are used is within a Small Computer Systems Interface (SCSI) protocol bridge. A SCSI protocol bridge is a device which manages SCSI processes between a computer and associated SCSI target devices.

A disk array connected to a SCSI bus may take a computer request for $2^{20}$ bytes of data and separate this into 16 ($2^4$) separate sub-requests for data to its underlying disk drives (each sub-request has $2^{16}$ bytes of data). When handling such a transfer within a SCSI protocol bridge using multiple concurrent chained-DMA operation, the limit on the number of concurrent data transfers is directly related to the amount of buffer memory available, and the sum of the data required for each concurrent sub-request.

The disk array may orchestrate queuing read-ahead requests to underlying drives at the launching of the first sub-request (and at each completion of a sub-request) in order to attempt to recover the gap in time that would otherwise occur if the sub-requests were serialized. However, this approach adds significant complexity. The problem in current designs is that memory used to buffer data for active (enabled, but not yet completed) chained-DMA operations is temporally poorly utilized when the application is such that the time between enabling the multiple concurrent chained-DMA operation and the completion of the multiple concurrent chained-DMA operation is typically much longer in time than any given associated memory buffer needs to be available for the operation and subsequent processing. Buffer memory for the entire operation is typically dedicated to the request for the entire time from "start" to "stop".

SUMMARY OF THE INVENTION

In accordance with the preferred embodiment of the present invention, a system which performs chained direct memory access (DMA) operations, includes a working set of buffers, a first-in-first-out memory, a first DMA co-processor, a second DMA co-processor and a controlling processor. The working set of buffers are available for receiving data from chained DMA operations. The first-in-first-out memory store addresses of buffers, from the working set of buffers, which are available for immediate allocation. The first DMA co-processor and the second DMA co-processor perform the chained DMA operations. The controlling processor sets up the chained DMA operations and adds addresses of free buffers to the first-in-first-out memory. When performing a first chained DMA operation, the first DMA co-processor accesses the first-in-first-out memory to allocate for itself a first buffer from the queue of buffers when a first link in the first chained DMA operation requires a buffer. When the first buffer is filled, the first DMA co-processor immediately notifies the controlling processor. When performing a second chained DMA operation, the second DMA co-processor accesses the first-in-first-out memory to allocate for itself a second buffer from the queue of buffers when a first link in the second chained DMA operation requires a buffer. When the second buffer is filled, the second DMA co-processor immediately notifies the controlling processor.

For example, the system is a small computer systems interface (SCSI) protocol bridge. In the preferred embodiment, when the first DMA co-processor accesses an address from the first-in-first-out memory, the address is stored in a scratch memory. Also, the first DMA co-processor performs the first chained DMA operation in accordance with a script sent from the controlling processor to the first DMA co-processor.

In the preferred embodiment, the first DMA co-processor accesses the first-in-first-out memory to allocate for itself a third buffer from the queue of buffers when a second link in the first chained DMA operation requires a buffer. When the third buffer is filled, the first DMA co-processor immediately notifies the controlling processor. When the second link in the first chained DMA operation requires another buffer, a fourth buffer is allocated from the queue of buffers, and when the fourth buffer is filled, the first DMA co-processor immediately notifies the controlling processor.

The present invention allows for significant reduction of request queuing due to memory limits, thus allowing more concurrence with a given amount of buffer memory.

DESCRIPTION OF THE PREFERRED EMBODIMENT

Figure 1:
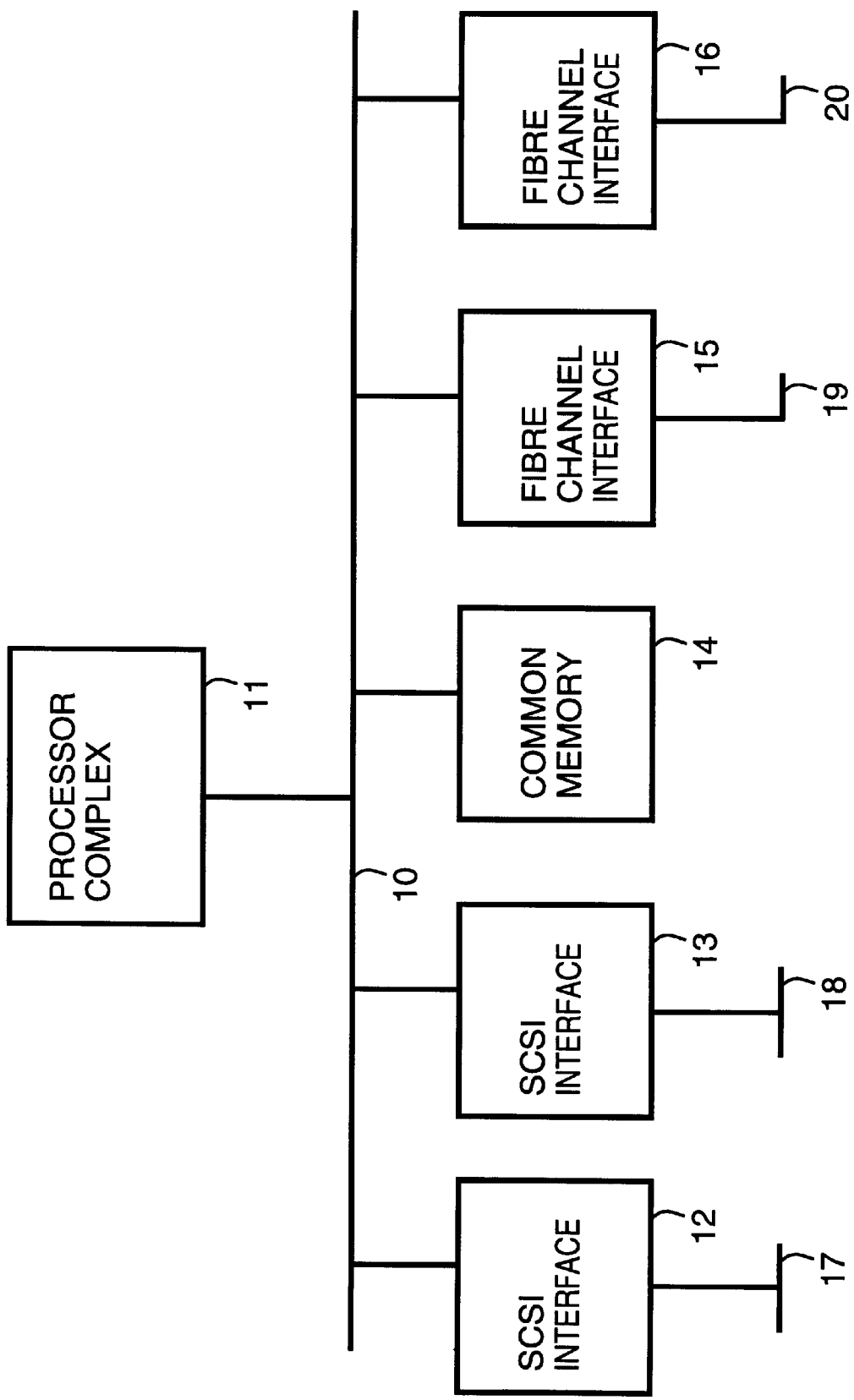
FIG. 1 is a simplified block diagram of a SCSI protocol bridge in accordance with a preferred embodiment of the present invention.

FIG. 1 is a simplified block diagram of a SCSI protocol bridge. A processor complex 11 includes, for example, a microprocessor, random access memory (RAM), read-only memory (ROM), and a user interface including light-emitting diodes (LEDs), user activated buttons, and so on.

A bus complex 10 allows data and commands to be transferred between processor complex 11, a SCSI interface 12, a SCSI interface 13, a common memory 14, a fibre channel interface 15 and a fibre channel interface 16.

SCSI interface 12 interfaces with a SCSI bus 17. SCSI bus 17 operates in accordance with the SCSI-2 bus protocol. SCSI interface 13 interfaces with a SCSI bus 18. SCSI bus 18 operates in accordance with the SCSI-2 bus protocol.

Fibre channel interface 15 interfaces with a fibre channel 19. Fibre channel 19 operates in accordance with the SCSI-3 protocol. Fibre channel interface 16 interfaces with a fibre channel 20. Fibre channel 20 operates in accordance with the SCSI-3 protocol.

Within each of SCSI interface 12, SCSI interface 13, fibre channel interface 15 and fibre channel interface 16, a DMA co-processor such as, for example, a Symbios 53c875 PCI SCSI controller, available from Symbios Logic Inc., 4420 Arrowswest Drive, Colorado Springs, Colo. 80907-3439, acts as a special purpose DMA co-processor. The Symbios 53c875 PCI SCSI controller has some general purpose capability programmable by "scripts". These "scripts" are used in performing chained-DMA operations.

Figure 2:
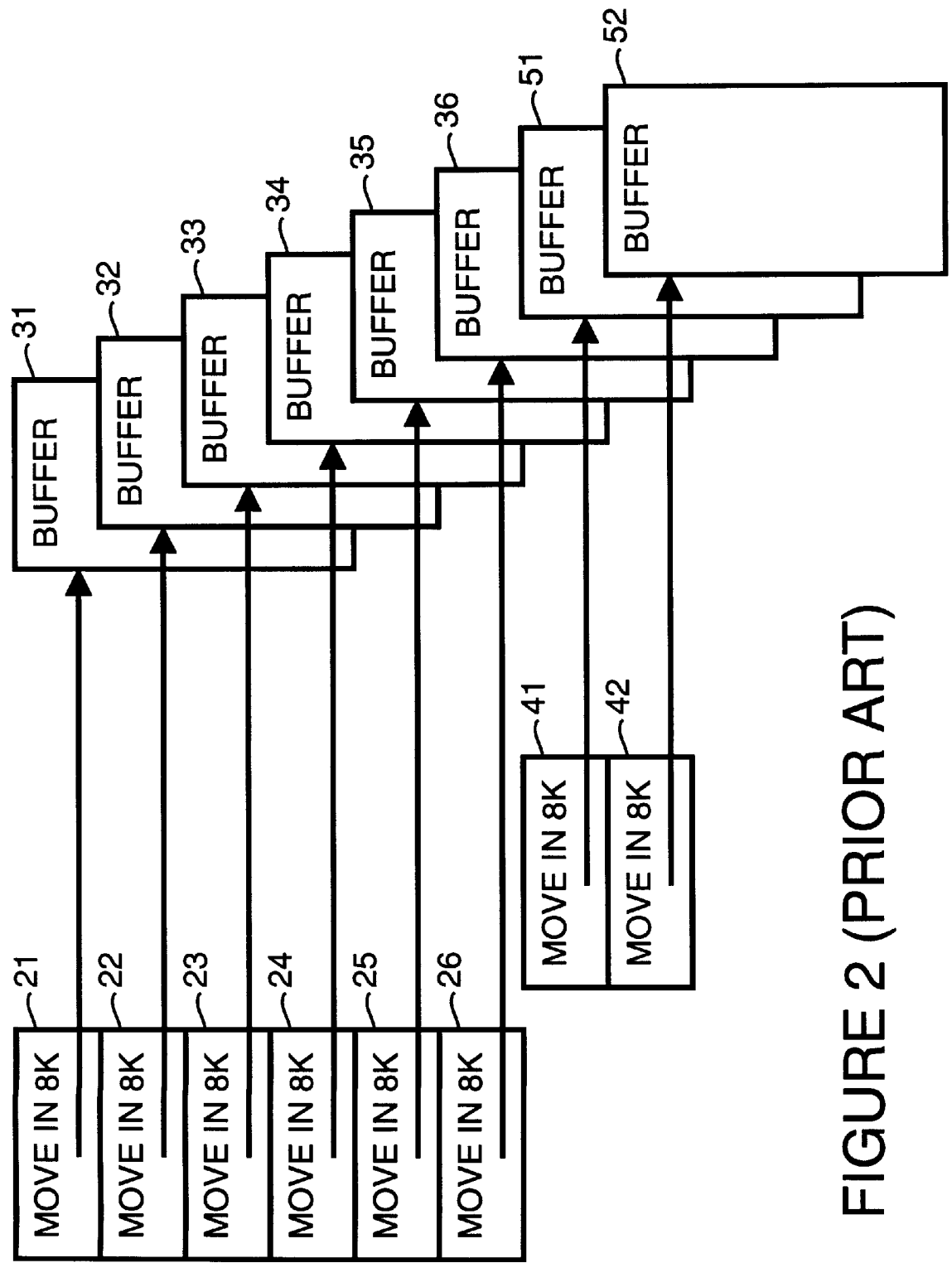
FIG. 2 is a simplified diagram which illustrates buffer allocation in a multiple concurrent chained-DMA operation in accordance with the prior art.

For example, FIG. 2 illustrates how the scripts would typically be used in the prior art to perform a chained-DMA operation from SCSI interface 12 or SCSI interface 13 to allocated buffers within common memory 14.

When setting up the chained-DMA operation, processor complex 11 generates a series of scripts for each chained DMA operation. In FIG. 2, this is illustrated by a script 21, a script 22, a script 23, a script 24, a script 25, a script 26 and a script 27 used for a first chained-DMA operation, and a script 41 and a script 42 used for a second chained-DMA operation. Each script provides the instructions necessary for the DMA co-processor to transfer 8K bytes of data into an allocated buffer.

Processor complex 11 also allocates a buffer (with a capacity of 8K bytes) within common memory 14 for each script. As shown in FIG. 2, an 8K buffer 31 is allocated for script 21. An 8K buffer 32 is allocated for script 22. An 8K buffer 33 is allocated for script 23. An 8K buffer 34 is allocated for script 24. An 8K buffer 35 is allocated for script 25. An 8K buffer 36 is allocated for script 26. An 8K buffer 41 is allocated for script 51. An 8K buffer 42 is allocated for script 52. The buffers are allocated for the entire chained DMA operation. Thus buffers 31 through 36 are allocated during the entire time the first chained DMA operation is performed. Buffers 51 and 52 are allocated during the entire time the second chained DMA operation is performed.

The preferred embodiment of the present invention, however, utilizes dynamic allocation and re-allocation of a relatively small working set of buffers whose number is dedicated for use by chained-DMA operations.

Figure 3:
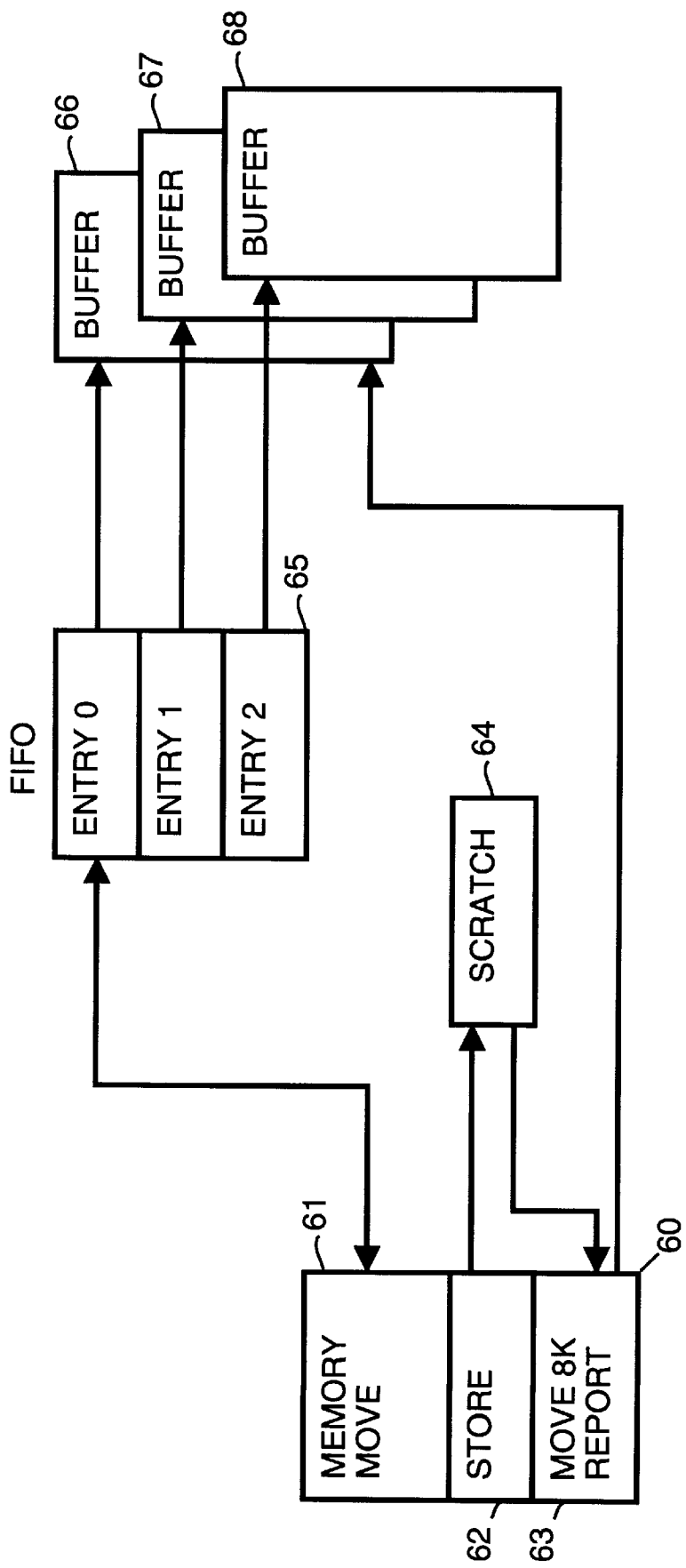
FIG. 3 is a simplified diagram which illustrates buffer allocation in a multiple concurrent chained-DMA operation in accordance with a preferred embodiment of the present invention.

FIG. 3 shows, for example, a buffer 66, a buffer 67 and a buffer 68 used as the buffers currently available from the working set of buffers.

Processor complex 11 maintains a policy such that a new chained-DMA operation will be launched only if there is a sufficient number of buffers available to cover the likely number of concurrent buffers in use. For a given buffer, the "in use" criteria includes the likely time required before the buffer is available for re-use by the same or a different chained-DMA operation.

In the preferred embodiment, as illustrated by FIG. 3, a first-in-first-out (FIFO) memory 65 is provided for holding addresses of the buffers within the working set of buffers which are currently available for dynamic allocation for buffering a chained-DMA operation.

When a DMA co-processor needs a new buffer to satisfy a link in a chained-DMA operation, the address is read by the DMA co-processor from FIFO memory 65. FIFO memory 65 has the characteristic that if it is empty of buffer addresses, FIFO memory 65 causes a bus retry, until processor complex 11 is able to detect free buffers and re-fill FIFO memory 65. Fair arbitration policies ensure that during bus-retries, that the retrying DMA co-processors do not block forward progress of other bus tenants. In the preferred embodiments there are sufficient buffers in the working set of buffers so that the retry mechanism does not normally come into play except in extreme conditions.

In the present invention each chained-DMA operation is controlled by the use of a single script. For example, FIG. 3 shows a script 60. In a first section 61, script 60 directs the DMA co-processor to access the address of an available buffer from FIFO memory 65. If there is no buffer available, FIFO memory 65 causes a bus retry, until processor complex 11 is able to detect free buffers and re-fill FIFO memory 65.

Once the DMA co-processor has obtained an available buffer from FIFO memory 65, in a section 62, script 60 directs the co-processor to store the address in a scratch memory 64. In a section 63, script 60 controls a data transfer by the co-processor of data into the available buffer. To obtain the address of the available buffer, DMA co-processor uses the address in scratch memory for indirect addressing, or actually writes the address into section 63 of the script to self modify code.

After the DMA co-processor has filled the buffer, section 63 of script 60 also directs the DMA co-processor to inform processor complex 11 of the buffer's availability for further processing (and eventual re-use). Since each DMA co-processor can have many chained-DMA operations concurrently enabled, the DMA co-processor informs the processor complex 11, not only of the buffer address used, but also which of the several contexts has used it. In the preferred embodiment, this two-part message is facilitated by a combination of "scripts" and hardware that presents a circular queue (as discussed in IEEE 1212.1) of messages from the point of view of processor complex 11, but a FIFO of instructions from the point of view the DMA co-processor. The queue of messages provides the pipelining needed that is part of the overall high performance design. The FIFO of instructions provides for multiple access by the multitude of DMA co-processors, where the FIFO access is mutually exclusive.

In the example given in FIG. 3 there are three working buffers, all of which, when free, may be placed on FIFO 65. While this illustrates the operation of the present invention, in more typical applications, the actual working set of buffers is, for example, a thousand buffers. FIFO 65 handles addresses for sixty-four buffers. Once processor complex 11 receives notification that a buffer is full, an address for an available buffer from the working buffers is added to FIFO 65. The data in the full buffer is emptied when accessed by the requesting entity.

Figure 4:
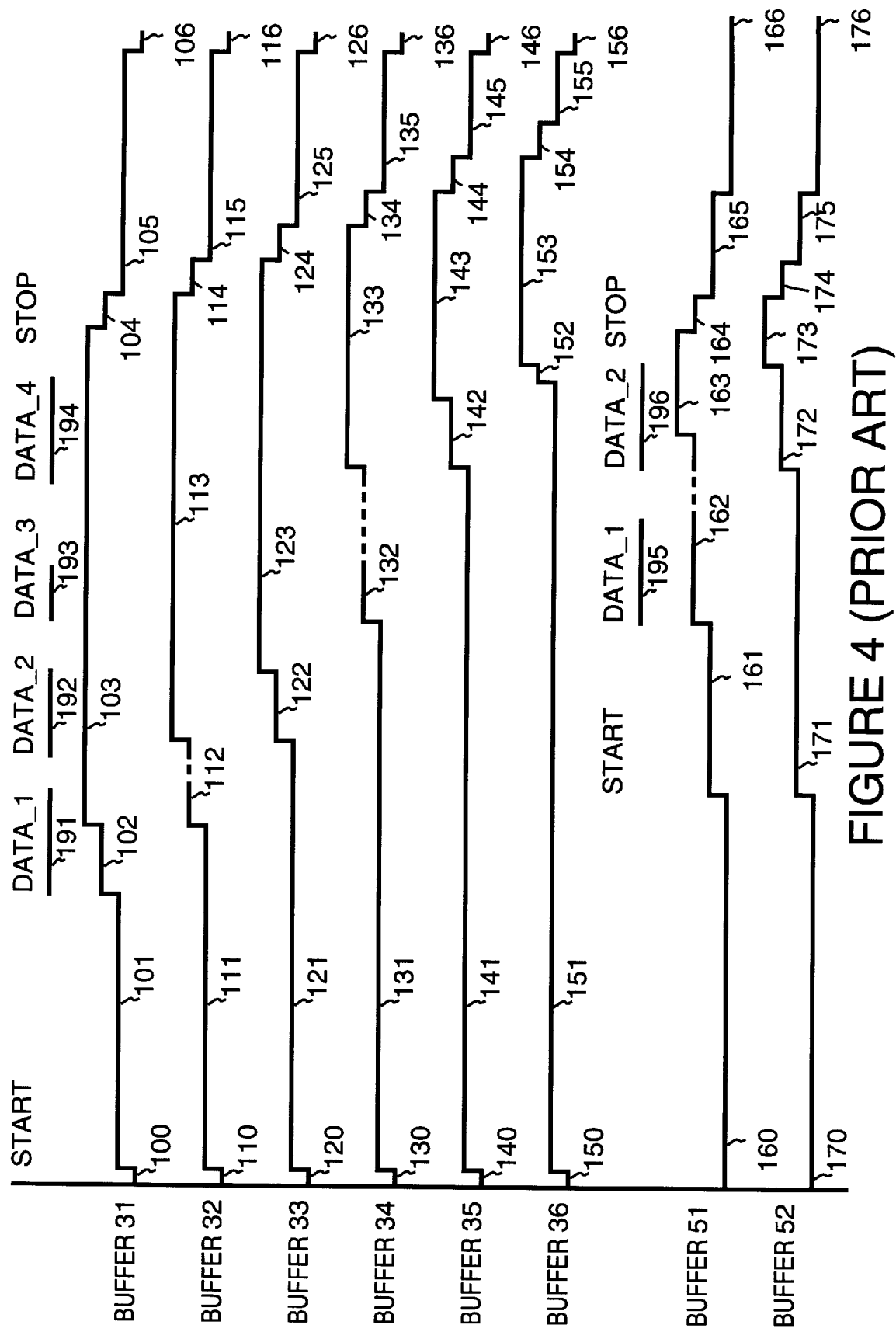
FIG. 4 is a simplified timing diagram which illustrates buffer allocation in a multiple concurrent chained-DMA operation in accordance with the prior art.
Figure 5:
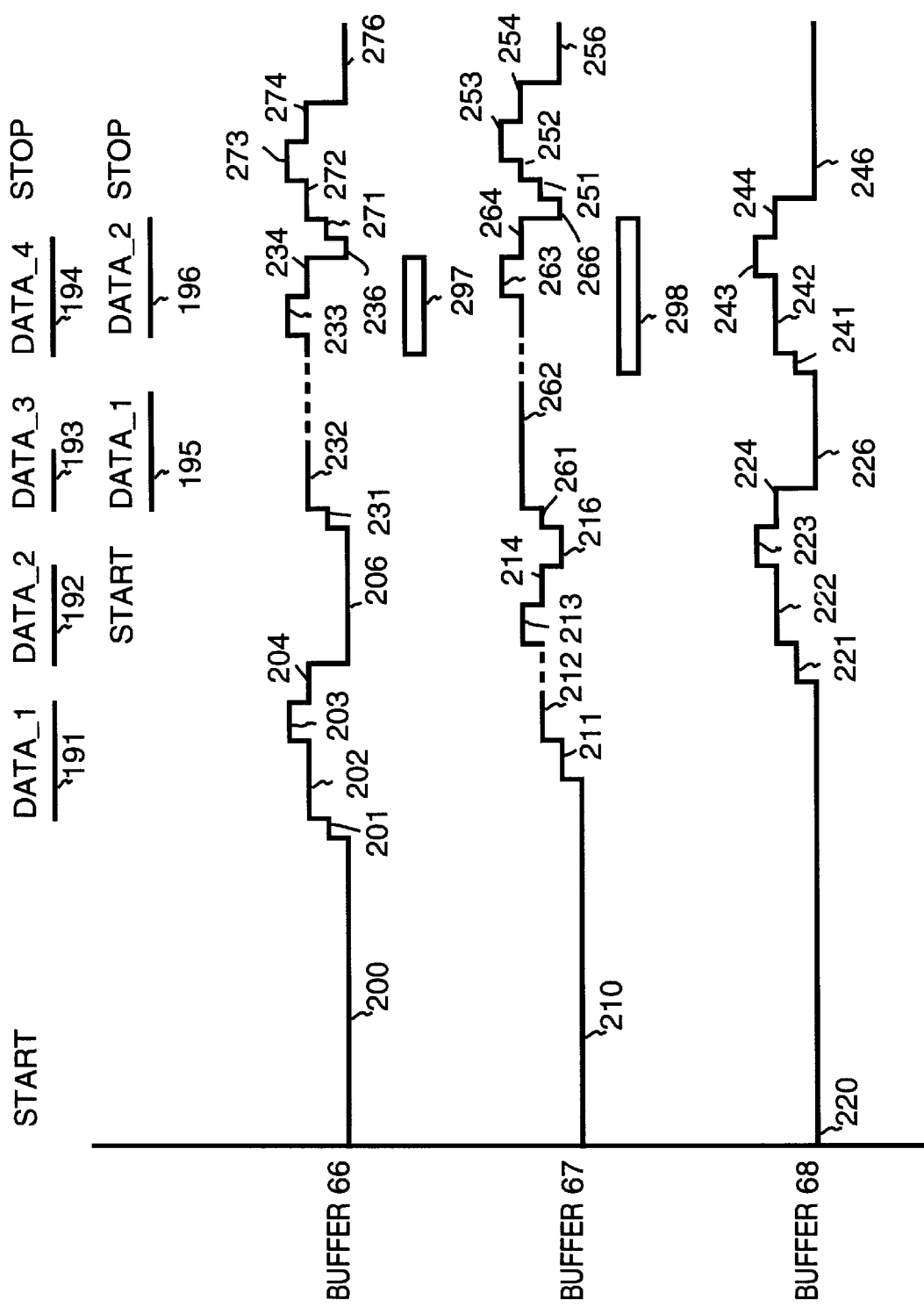
FIG. 5 is a simplified timing diagram which illustrates buffer allocation in a multiple concurrent chained-DMA operation in accordance with a preferred embodiment of the present invention.

FIG. 4 and 5 are simplified timing diagrams which illustrate allocation of buffers for the prior art buffer system shown in FIG. 2 and the preferred embodiment shown in FIG. 3.

As shown in FIG. 4, a first chained DMA operation includes a start event (START), four active data transfers (DATA_1, DATA_2, DATA_3 and DATA_4) and a stop (STOP) event. The duration of active data transfer DATA_1 is represented by a line 191. The duration of active data transfer DATA_2 is represented by a line 192. The duration of active data transfer DATA_3 is represented by a line 193. The duration of active data transfer DATA_4 is represented by a line 194.

Before the start event, buffer 31 is available (free) as represented by the vertical level of section 100 of the diagram trace for buffer 31. Likewise, buffer 32 is available (free) as represented by the vertical level of section 110 of the diagram trace for buffer 32. Buffer 33 is available (free) as represented by the vertical level of section 120 of the diagram trace for buffer 33. Buffer 34 is available (free) as represented by the vertical level of section 130 of the diagram trace for buffer 34. Buffer 35 is available (free) as represented by the vertical level of section 140 of the diagram trace for buffer 35. Buffer 36 is available (free) as represented by the vertical level of section 150 of the diagram trace for buffer 36.

Once the start event has occurred, buffer 31 is allocated (as represented by the vertical level of section 101 of the diagram trace for buffer 31), buffer 32 is allocated (as represented by the vertical level of section 111 of the diagram trace for buffer 32), buffer 33 is allocated (as represented by the vertical level of section 121 of the diagram trace for buffer 33), buffer 34 is allocated (as represented by the vertical level of section 131 of the diagram trace for buffer 34), buffer 35 is allocated (as represented by the vertical level of section 141 of the diagram trace for buffer 35), buffer 36 is allocated (as represented by the vertical level of section 151 of the diagram trace for buffer 36). The buffers are allocated when processor complex 11 sets up the script and forwards the script to the DMA co-processor for execution.

During the active data transfer of DATA_1, buffer 31 is filling, as represented by the vertical level of section 102 of the diagram trace for buffer 31, until full, as represented by the vertical level of section 103 of the diagram trace for buffer 31. Once buffer 31 is full, buffer 32 begins filling, as represented by the vertical level of section 112 of the diagram trace for buffer 32. After active data transfer of DATA_1 is completed, the dashed line of section 112 represents that the filling of buffer 32 is paused pending the start of active data transfer of DATA_2.

During the active data transfer of DATA_2, buffer 32 is still filling, as represented by the vertical level of section 112 of the diagram trace for buffer 32, until full, as represented by the vertical level of section 113 of the diagram trace for buffer 32. Once buffer 32 is full, buffer 33 begins filling, as represented by the vertical level of section 122 of the diagram trace for buffer 32, until full, as represented by the vertical level of section 123 of the diagram trace for buffer 33.

During the active data transfer of DATA_3, buffer 34 is filling, as represented by the vertical level of section 132 of the diagram trace for buffer 34. After active data transfer of DATA_3 is completed, the dashed line of section 132 represents that the filling of buffer 34 is paused pending the start of active data transfer of DATA_4.

During the active data transfer of DATA_4, buffer 34 is still filling, as represented by the vertical level of section 132 of the diagram trace for buffer 34, until full, as represented by the vertical level of section 133 of the diagram trace for buffer 34. Once buffer 34 is full, buffer 35 begins filling, as represented by the vertical level of section 142 of the diagram trace for buffer 35, until full, as represented by the vertical level of section 143 of the diagram trace for buffer 35.

Once buffer 35 is full, buffer 36 begins filling, as represented by the vertical level of section 152 of the diagram trace for buffer 36, until DATA_4 (and thus the data transfer for the first chained DMA operation) is complete, as represented by the vertical level of section 153 of the diagram trace for buffer 36.

Once the data transfer for the first chained DMA operation is complete, the STOP event occurs. The DMA co-processor notifies processor complex 11 that the first chained DMA operation has been completed. This allows each of the buffers used for the first chained DMA operation to be emptied.

In FIG. 4, the vertical level of section 104 of the diagram trace for buffer 31 indicates that buffer 31 is being emptied. The vertical level of section 105 of the diagram trace for buffer 31 indicates that buffer 31 has been emptied. The vertical level of section 114 of the diagram trace for buffer 32 indicates that buffer 32 is being emptied. The vertical level of section 115 of the diagram trace for buffer 32 indicates that buffer 32 has been emptied. The vertical level of section 124 of the diagram trace for buffer 33 indicates that buffer 33 is being emptied. The vertical level of section 125 of the diagram trace for buffer 33 indicates that buffer 33 has been emptied. The vertical level of section 134 of the diagram trace for buffer 34 indicates that buffer 34 is being emptied. The vertical level of section 135 of the diagram trace for buffer 34 indicates that buffer 34 has been emptied. The vertical level of section 144 of the diagram trace for buffer 35 indicates that buffer 35 is being emptied. The vertical level of section 145 of the diagram trace for buffer 35 indicates that buffer 35 has been emptied. The vertical level of section 154 of the diagram trace for buffer 36 indicates that buffer 36 is being emptied. The vertical level of section 155 of the diagram trace for buffer 36 indicates that buffer 36 has been emptied.

After buffers 31, 32, 33, 34, 35 and 36 have been emptied, these buffers are then made available for other chained DMA operations, as represented respectively by a vertical level of section 106 of the diagram trace for buffer 31, a vertical level of section 116 of the diagram trace for buffer 32, a vertical level of section 126 of the diagram trace for buffer 33, a vertical level of section 136 of the diagram trace for buffer 34, a vertical level of section 146 of the diagram trace for buffer 35, a vertical level of section 156 of the diagram trace for buffer 36.

Concurrent to the first chained DMA operation, a second chained DMA operation occurs which includes a start event (START), two active data transfers (DATA_1 and DATA_2) and a stop (STOP) event. The duration of active data transfer DATA_1 is represented by a line 195. The duration of active data transfer DATA_2 is represented by a line 196.

Before the start event, buffer 51 is available (free) as represented by the vertical level of section 160 of the diagram trace for buffer 51. Likewise, buffer 52 is available (free) as represented by the vertical level of section 170 of the diagram trace for buffer 52.

Once the start event has occurred, buffer 51 is allocated (as represented by the vertical level of section 161 of the diagram trace for buffer 51) and buffer 52 is allocated (as represented by the vertical level of section 171 of the diagram trace for buffer 52).

During the active data transfer of DATA_1, buffer 51 is filling, as represented by the vertical level of section 162 of the diagram trace for buffer 51. After active data transfer of DATA_1 is completed, the dashed line of section 162 represents that the filling of buffer 51 is paused pending the start of active data transfer of DATA_2.

During the active data transfer of DATA_2, buffer 51 is still filling, as represented by the vertical level of section 162 of the diagram trace for buffer 51, until full, as represented by the vertical level of section 163 of the diagram trace for buffer 51. Once buffer 51 is full, buffer 52 begins filling, as represented by the vertical level of section 172 of the diagram trace for buffer 52, until DATA_2 (and thus the data transfer for the second chained DMA operation) is complete, as represented by the vertical level of section 173 of the diagram trace for buffer 52.

Once the data transfer for the second chained DMA operation is complete, the STOP event occurs. The DMA co-processor notifies processor complex 11 that the second chained DMA operation has been completed. This allows each of the buffers used for the second chained DMA operation to be emptied. In FIG. 4, the vertical level of section 164 of the diagram trace for buffer 51 indicates that buffer 51 is being emptied. The vertical level of section 165 of the diagram trace for buffer 51 indicates that buffer 51 has been emptied. The vertical level of section 174 of the diagram trace for buffer 52 indicates that buffer 52 is being emptied. The vertical level of section 175 of the diagram trace for buffer 52 indicates that buffer 52 has been emptied.

After buffers 51 and 52 have been emptied, processor complex 11 makes these buffers available for other chained DMA operations, as represented by a vertical level of section 166 of the diagram trace for buffer 51 and a vertical level of section 176 of the diagram trace for buffer 52, respectively.

FIG. 5 shows the first chained DMA operation and the second chained DMA operation performed using the buffer allocation scheme illustrated by FIG. 3.

As shown in FIG. 5, the first chained DMA operation still includes a start event (START), four active data transfers (DATA_1, DATA_2, DATA_3 and DATA_4) and a stop (STOP) event. The duration of active data transfer DATA_1 is represented by a line 191. The duration of active data transfer DATA_2 is represented by a line 192. The duration of active data transfer DATA_3 is represented by a line 193. The duration of active data transfer DATA_4 is represented by a line 194.

Concurrent to the first chained DMA operation, the second chained DMA operation occurs and still includes a start event (START), two active data transfers (DATA_1 and DATA_2) and a stop (STOP) event. The duration of active data transfer DATA_1 is represented by a line 195. The duration of active data transfer DATA_2 is represented by a line 196.

Even after the start event for the first chained DMA operation, buffer 66 is available (free) as represented by the vertical level of section 200 of the diagram trace for buffer 66. Likewise, buffer 67 is available (free) as represented by the vertical level of section 210 of the diagram trace for buffer 67. Buffer 68 is available (free) as represented by the vertical level of section 220 of the diagram trace for buffer 66. These buffers are not allocated until immediately before they are used in a data transaction.

Immediately before the active data transfer of DATA_1 for the first chained DMA operation, buffer 66 is allocated for the data transfer, as represented by the vertical level of section 201 of the diagram trace for buffer 66.

During the active data transfer of DATA_1 for the first chained DMA operation, buffer 66 is filling, as represented by the vertical level of section 202 of the diagram trace for buffer 66, until full, as represented by the vertical level of section 203 of the diagram trace for buffer 66. The DMA co-processor immediately reports that buffer 66 is full. This allows processor complex 11 to authorize the data to be utilized by the requesting program. This allows buffer 66 to be immediately emptied. In FIG. 6, the vertical level of section 204 of the diagram trace for buffer 66 indicates that buffer 66 is being emptied. After being emptied, processor complex 11 frees buffer 66 (placing the address of buffer 66 within the FIFO memory 65) so that buffer 66 is ready for re-allocation. This is represented by the vertical level of section 206 of the diagram trace for buffer 66.

Immediately before buffer 66 is full, buffer 67 is allocated, as represented by the vertical level of section 211 of the diagram trace for buffer 67. Once buffer 66 is full, buffer 67 begins filling, as represented by the vertical level of section 212 of the diagram trace for buffer 67. After active data transfer of DATA_1 for the first chained DMA operation is completed, the dashed line of section 212 represents that the filling of buffer 67 is paused pending the start of active data transfer of DATA_2 for the first chained DMA operation.

During the active data transfer of DATA_2 for the first chained DMA operation, buffer 67 is still filling, as represented by the vertical level of section 212 of the diagram trace for buffer 67, until full, as represented by the vertical level of section 213 of the diagram trace for buffer 67. The DMA co-processor immediately reports that buffer 67 is full. This allows processor complex 11 to authorize the data to be utilized by the requesting program. This allows buffer 67 to be immediately emptied. In FIG. 6, the vertical level of section 214 of the diagram trace for buffer 67 indicates that buffer 67 is being emptied. After being emptied, processor complex 11 frees buffer 67 (placing the address of buffer 67 within the FIFO memory 65) so that buffer 67 is ready for re-allocation. This is represented by the vertical level of section 216 of the diagram trace for buffer 67.

Immediately before buffer 67 is fill, buffer 68 is allocated, as represented by the vertical level of section 221 of the diagram trace for buffer 68. Once buffer 67 is full, buffer 68 begins filling, as represented by the vertical level of section 222 of the diagram trace for buffer 68, until full, as represented by the vertical level of section 223 of the diagram trace for buffer 68. The DMA co-processor immediately reports that buffer 68 is full. This allows processor complex 11 to authorize the data to be utilized by the requesting program. This allows buffer 68 to be immediately emptied. In FIG. 5, the vertical level of section 224 of the diagram trace for buffer 68 indicates that buffer 68 is being emptied. After being emptied, processor complex 11 frees buffer 68 (placing the address of buffer 68 within the FIFO memory 65) so that buffer 68 is ready for re-allocation. This is represented by the vertical level of section 226 of the diagram trace for buffer 68.

Immediately before the active data transfer of DATA_3 for the first chained DMA operation, buffer 66 is allocated for the data transfer, as represented by the vertical level of section 231 of the diagram trace for buffer 66. During the active data transfer of DATA_3 for the first chained DMA operation, buffer 66 is filling, as represented by the vertical level of section 232 of the diagram trace for buffer 66. After active data transfer of DATA_3 for the first chained DMA operation is completed, the dashed line of section 232 represents that the filling of buffer 66 is paused pending the start of active data transfer of DATA_4 for the first chained DMA operation.

During the active data transfer of DATA_4 for the first chained DMA operation, buffer 66 is still filling, as represented by the vertical level of section 232 of the diagram trace for buffer 66, until full, as represented by the vertical level of section 233 of the diagram trace for buffer 66. The DMA co-processor immediately reports that buffer 66 is full. This allows processor complex 11 to authorize the data to be utilized by the requesting program. This allows buffer 66 to be immediately emptied. In FIG. 5, the vertical level of section 234 of the diagram trace for buffer 66 indicates that buffer 66 is being emptied. After being emptied, processor complex 11 frees buffer 66 (placing the address of buffer 66 within the FIFO memory 65) so that buffer 66 is ready for re-allocation. This is represented by the vertical level of section 236 of the diagram trace for buffer 66.

Concurrent to the first chained DMA operation, the second chained DMA operation occurs. Once the start event for the second chained DMA operation occurs, no buffers are allocated until data is ready to be transferred.

Immediately before the active data transfer of DATA_1 for the second chained DMA operation, buffer 67 is allocated for the data transfer, as represented by the vertical level of section 261 of the diagram trace for buffer 66.

During the active data transfer of DATA_1 for the second chained DMA operation, buffer 67 is filling, as represented by the vertical level of section 262 of the diagram trace for buffer 67. After active data transfer of DATA_1 for the second chained DMA operation is completed, the dashed line of section 262 represents that the filling of buffer 67 is paused pending the start of active data transfer of DATA_2 for the second chained DMA operation.

During the active data transfer of DATA_2 for the second chained DMA operation, buffer 67 is still filling, as represented by the vertical level of section 262 of the diagram trace for buffer 67, until full, as represented by the vertical level of section 263 of the diagram trace for buffer 67. The DMA co-processor immediately reports that buffer 67 is full. This allows processor complex 11 to authorize the data to be utilized by the requesting program. This allows buffer 67 to be immediately emptied. In FIG. 5, the vertical level of section 264 of the diagram trace for buffer 67 indicates that buffer 67 is being emptied. After being emptied, processor complex 11 frees buffer 67 (placing the address of buffer 67 within the FIFO memory 65) so that buffer 67 is ready for re-allocation. This is represented by the vertical level of section 266 of the diagram trace for buffer 67.

During the active data transfer of DATA_4 for the first chained DMA operation, immediately before buffer 66 is full, buffer 68 is allocated for continuing the data transfer, as represented by the vertical level of section 241 of the diagram trace for buffer 68. Once buffer 66 is full, buffer 68 begins filling, as represented by the vertical level of section 242 of the diagram trace for buffer 68, until full, as represented by the vertical level of section 243 of the diagram trace for buffer 68. The DMA co-processor immediately reports that buffer 68 is full. This allows processor complex 11 to authorize the data to be utilized by the requesting program. This allows buffer 68 to be immediately emptied. In FIG. 5, the vertical level of section 244 of the diagram trace for buffer 67 indicates that buffer 68 is being emptied. After being emptied, processor complex 11 frees buffer 68 (placing the address of buffer 68 within the FIFO memory 65) so that buffer 68 is ready for re-allocation. This is represented by the vertical level of section 246 of the diagram trace for buffer 68.

During the active data transfer of DATA_2 for the second chained DMA operation, immediately before buffer 66 is full, the DMA co-processor attempts to allocate a buffer to complete the data transfer. However, all the data buffers are allocated. FIFO memory 65 causes a bus retry, until processor complex 11 is able to detect free buffers and re-fill FIFO memory 65. This period of retry is presented by bar 297.

Once buffer 66 is freed, as represented by the vertical level of section 236 of the diagram trace for buffer 66, buffer 66 is allocated as represented by the vertical level of section 271 of the diagram trace for buffer 66. Then, buffer 66 begins filling, as represented by the vertical level of section 272 of the diagram trace for buffer 66, until DATA_2 for the second chained DMA operation (and thus the data transfer for the second chained DMA operation) is complete, as represented by the vertical level of section 273 of the diagram trace for buffer 66. The DMA co-processor immediately reports that buffer 66 is full. This allows processor complex 11 to authorize the data to be utilized by the requesting program. This allows buffer 66 to be immediately emptied. In FIG. 5, the vertical level of section 274 of the diagram trace for buffer 66 indicates that buffer 66 is being emptied. After being emptied, processor complex 11 frees buffer 66 (placing the address of buffer 66 within the FIFO memory 65) so that buffer 66 is ready for re-allocation. This is represented by the vertical level of section 276 of the diagram trace for buffer 66.

During the active data transfer of DATA_4 for the first chained DMA operation, immediately before buffer 68 is full, the DMA co-processor attempts to allocate a buffer to complete the data transfer. However, all the data buffers are allocated. FIFO memory 65 causes a bus retry, until processor complex 11 is able to detect free buffers and re-fill FIFO memory 65. This period of retry is presented by bar 298.

Once buffer 67 is freed, as represented by the vertical level of section 266 of the diagram trace for buffer 67, buffer 67 is allocated as represented by the vertical level of section 251 of the diagram trace for buffer 67. Then, buffer 67 begins filling, as represented by the vertical level of section 252 of the diagram trace for buffer 67, until DATA_4 for the first chained DMA operation (and thus the data transfer for the first chained DMA operation) is complete, as represented by the vertical level of section 253 of the diagram trace for buffer 67. The DMA co-processor immediately reports that buffer 67 is full. This allows processor complex 11 to authorize the data to be utilized by the requesting program.

This allows buffer 67 to be immediately emptied. In FIG. 5, the vertical level of section 254 of the diagram trace for buffer 67 indicates that buffer 67 is being emptied. After being emptied, processor complex 11 frees buffer 67 (placing the address of buffer 67 within the FIFO memory 65) so that buffer 67 is ready for re-allocation. This is represented by the vertical level of section 256 of the diagram trace for buffer 67.

The foregoing discussion discloses and describes merely exemplary methods and embodiments of the present invention. As will be understood by those familiar with the art, the invention may be embodied in other specific forms without departing from the spirit or essential characteristics thereof. For example, in the preferred embodiment, the DMA co-processor's general purpose capability was exploited. However, DMA controllers without general purpose capability can be utilized to implement the present invention. Accordingly, the disclosure of the present invention is intended to be illustrative, but not limiting, of the scope of the invention, which is set forth in the following claims.

I claim:

1. A system which performs chained direct memory access (DMA) operations, comprising:
   a working set of buffers available for receiving data from chained DMA operations;
   a first-in-first-out memory for storing addresses of buffers, from the working set of buffers, which are available for immediate allocation;
   a first DMA co-processor which performs a portion of the chained DMA operations;
   second DMA co-processor which performs a portion of the chained DMA operations; and,
   a controlling processor which sets up the chained DMA operations and adds addresses of free buffers to the first-in-first-out memory;
   wherein buffers required for chained DMA operations are allocated separately for each link and only when needed by each link so that:
      when performing a first chained DMA operation, the first DMA co-processor accesses the first-in-first-out memory to allocate for itself a first buffer from the queue of buffers when a first link in the first chained DMA operation requires a buffer, and when the first buffer is filled, the first DMA co-processor immediately notifies the controlling processor; and,
      when performing a second chained DMA operation, the second DMA co-processor accesses the first-in-first-out memory to allocate for itself a second buffer from the queue of buffers when a first link in the second chained DMA operation requires a buffer, and when the second buffer is filled, the second DMA co-processor immediately notifies the controlling processor.

2. A system as in claim 1, wherein the first DMA co-processor accesses the first-in-first-out memory to allocate for itself a third buffer from the queue of buffers when a second link in the first chained DMA operation requires a buffer, and when the third buffer is filled, the first DMA co-processor immediately notifies the controlling processor.

3. A system as in claim 2, wherein when the second link in the first chained DMA operation requires another buffer, a fourth buffer is allocated from the queue of buffers, and when the fourth buffer is filled, the first DMA co-processor immediately notifies the controlling processor.

4. A system as in claim 1, wherein when the first link in the first chained DMA operation requires another buffer, a third buffer is allocated from the queue of buffers, and when the third buffer is filled, the first DMA co-processor immediately notifies the controlling processor.

5. A system as in claim 1, wherein when performing a third chained DMA operation, the first DMA co-processor accesses the first-in-first-out memory to allocate for itself a third buffer from the queue of buffers when a first link in the third chained DMA operation requires a buffer, and when the third buffer is filled, the first DMA co-processor immediately notifies the controlling processor.

6. A system as in claim 1 additionally comprising:
   a scratch memory, wherein when the first DMA co-processor accesses an address from the first-in-first-out memory, the address is stored in the scratch memory.

7. A system as in claim 1 wherein the first DMA co-processor performs the first chained DMA operation in accordance with a script sent from the controlling processor to the first DMA co-processor.

8. A system as in claim 1 wherein the system is a small computer systems interface (SCSI) protocol bridge.

9. A method for performing chained direct memory access (DMA) operations, comprising the following steps:
   (a) maintaining a queue of buffers available for receiving data from chained DMA operations; and,
   (b) performing chained DMA operations by a plurality of DMA co-processors, all the DMA co-processors from the plurality of co-processors obtaining buffers from the queue of buffers so that buffers required for chained DMA operations are obtained separately for each link and only when needed by each link, wherein a first chained DMA operation, includes the following steps:
      (b.1) when a first link in the first chained DMA operation requires a buffer, allocating a first buffer from the queue of buffers, and
      (b.2) when the first buffer is filled, immediately notifying a controlling processor.

10. A method as in claim 9, wherein step (b) additionally includes the following substeps:
    (b.3) when a second link in the first chained DMA operation requires a buffer, allocating a second buffer from the queue of buffers, and
    (b.4) when the second buffer is filled, immediately notifying the controlling processor.

11. A method as in claim 10, wherein step (b) additionally includes the following substeps:
    (b.5) when the second link in the first chained DMA operation requires another buffer, allocating a third buffer from the queue of buffers, and
    (b.6) when the third buffer is filled, immediately notifying the controlling processor.

12. A method as in claim 9, wherein step (b) additionally includes the following substeps:
    (b.3) when the first link in the first chained DMA operation requires another buffer, allocating a second buffer from the queue of buffers, and
    (b.4) when the second buffer is filled, immediately notifying the controlling processor.

13. A method as in claim 9, additionally comprising the following step:
    (c) performing a second chained DMA operation, including the following steps:
       (c.1) when a first link in the second chained DMA operation requires a buffer, allocating a second buffer from the queue of buffers, and (c.2) when the second buffer is filled, immediately notifying a controlling processor.

14. A method as in claim 13 wherein the first chained DMA operation is performed by a first DMA co-processor and the second DMA chained DMA operation is performed by a second DMA co-processor.

15. A method as in claim 9 wherein substep (b.1) includes obtaining an address of the first buffer from the queue of buffers and storing the address in a scratch memory.

16. A method as in claim 9 wherein in step (b) performance of the first chained DMA operation is in accordance with a script sent from the controlling processor to a first DMA co-processor.

17. A method for performing a chained direct memory access (DMA) operation, comprising the following steps:
(a) maintaining a queue of buffers available for receiving data from chained DMA operations;
(b) performing, by a first DMA co-processor, a first chained DMA operation, including the following steps:
 (b.1) when a first link in the first chained DMA operation requires a buffer, allocating a first buffer from the queue of buffers, and
 (b.2) when the first buffer is filled, immediately notifying a controlling processor; and,
(c) performing, by a second DMA co-processor, a second chained DMA operation, including the following steps:
 (c.1) when a first link in the second chained DMA operation requires a buffer, allocating a second buffer from the queue of buffers, and
 (c.2) when the second buffer is filled, immediately notifying a controlling processor.

18. A method as in claim 17, wherein step (b) additionally includes the following substeps:
(b.3) when a second link in the first chained DMA operation requires a buffer, allocating a third buffer from the queue of buffers, and
(b.4) when the third buffer is filled, immediately notifying the controlling processor.

19. A method as in claim 17 wherein substep (b.1) includes obtaining an address of the first buffer from the queue of buffers and storing the address in a scratch memory.

* * * * *